US008732288B2

(12) United States Patent
Chun (10) Patent No.: US 8,732,288 B2
(45) Date of Patent: May 20, 2014

(54) APPARATUS AND METHOD FOR CONTROLING NETWORK USING IDENTIFICATION INFORMATION OF OBJECT (75) Inventor: Woojik Chun, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 250 days.

(21) Appl. No.: 13/229,194

(22) Filed: Sep. 9, 2011

(65) Prior Publication Data

US 2012/0066409 A1    Mar. 15, 2012

(30) Foreign Application Priority Data

Sep. 9, 2010  (KR) .................. 10-2010-0088519
Jun. 30, 2011  (KR) .................. 10-2011-0064368

(51) Int. Cl.
*G06F 15/173* (2006.01)

(52) U.S. Cl.
USPC ........... 709/223; 709/203; 709/217; 370/254; 370/401

(58) Field of Classification Search
USPC ........... 709/223, 224, 203, 217; 370/254, 401
See application file for complete search history.

(56) References Cited

U.S. PATENT DOCUMENTS

| 8,234,714 | B2* | 7/2012 | Naito | 726/27 |
|---|---|---|---|---|
| 8,392,451 | B1* | 3/2013 | Pierce et al. | 707/769 |
| 8,468,336 | B2* | 6/2013 | Finlay | 713/152 |
| 2002/0010798 | A1* | 1/2002 | Ben-Shaul et al. | 709/247 |
| 2002/0184390 | A1* | 12/2002 | Alkhatib | 709/245 |
| 2003/0078960 | A1* | 4/2003 | Murren et al. | 709/203 |
| 2005/0102354 | A1* | 5/2005 | Hollenbeck et al. | 709/203 |
| 2006/0184646 | A1* | 8/2006 | Schmidt et al. | 709/218 |
| 2007/0058568 | A1* | 3/2007 | Previdi et al. | 370/254 |
| 2009/0025088 | A1* | 1/2009 | Naito | 726/27 |
| 2010/0142484 | A1* | 6/2010 | Bachmann et al. | 370/331 |
| 2011/0093613 | A1* | 4/2011 | Banes et al. | 709/238 |
| 2012/0023153 | A1* | 1/2012 | Karasaridis | 709/203 |

\* cited by examiner

*Primary Examiner* — LaShonda Jacobs (74) *Attorney, Agent, or Firm* — Nelson Mullins Riley & Scarborough LLP; Anthony A. Laurentano, Esq.; Lewis Lee, Esq.

(57) ABSTRACT

Provided is an apparatus and method for controlling a network using identification information of an object. The network controlling apparatus may include an extractor to extract identification information of a receiving object from received data, and a controller to verify, from a database, forwarding information that is stored in correspondence to the identification information, and to transfer the data to a gateway associated with a second domain designated by the forwarding information, when the receiving object is not included in a first domain.

19 Claims, 6 Drawing Sheets

| IDENTIFICATION INFORMATION | ROUTING HINT | SUBSEQUENT DOMAIN | GATEWAY |
|---|---|---|---|
| ID 1 | D0 | D1 | ADDRESS IN D6 |
| ID 2 | D0;D3 | D1 | ADDRESS IN D6 |
| ID 5 | D0;D3;D8 | D1 | ADDRESS IN D6 |

APPARATUS AND METHOD FOR CONTROLLING NETWORK USING IDENTIFICATION INFORMATION OF OBJECT

CROSS-REFERENCE TO RELATED APPLICATIONS

This application claims the priority benefit of Korean Patent Application No. 10-2010-0088519, filed on Sep. 9, 2010, and Korean Patent Application No. 10-2011-0064368, filed on Jun. 30, 2011, in the Korean Intellectual Property Office, the disclosures of which are incorporated herein by reference.

BACKGROUND

1. Field of the Invention

Embodiments of the present invention relate to an apparatus and method of controlling a communication between objects using identification information of the objects.

2. Description of the Related Art

An existing information communication method has selected a route based on an address system of designating locations of communication objects that desire to exchange information, and has transferred information via the selected route.

Such information communication method may perform a communication based on a location of a communication object instead of directly selecting the communication object. Therefore, when the communication object moves or when the communication object has a plurality of addresses, it may be difficult to effectively cope with the above circumstance. Also, when a malicious communication object changes its address or informs the address untruthfully, a serious security issue, for example, a denial of service may occur.

Accordingly, a communication method using a location-independent globally unique identifier is one of influential methods that have been proposed to overcome the constraints in the location based address system. In the communication method, all of communication objects may perform communication based on an identifier designating a corresponding object, instead of an address based on a location of the corresponding object. Therefore, even though a communication object moves to another location, the communication object may have the same identifier at all times. Accordingly, a mobility issue may be solved. Since an identifier of directly designating a communication object is used, it is possible to solve a security issue that may occur using a false identifier.

When configuring a communication method using a globally unique identifier in an actual communication network, a transmitting communication object may require a technology of fining a current location of a receiving communication object using a location-independent identifier for a communication with the receiving communication object. For example, the transmitting communication object may require a method of finding a telephone number with a name of a predetermined person to call the predetermined person.

For example, a method of finding a current location using an identifier may be a method of storing an identifier and current location pair in a database and retrieving the identifier and current location pair. However, in this method, when a number of identifiers increases to be at least a predetermined number, a performance may be seriously degraded. That is, an extensibility issue may occur.

To solve the extensibility issue, a grouping method having a hierarchical structure that may classify identifiers based on various criteria, assign an identifier to a group of classified identifiers, and enables the identifier group to belong to another identifier group may be proposed. A hierarchical identifier grouping method may solve the extensibility issue, however, may encounter a new issue that a group from which a given identifier is to be retrieved should be known.

Accordingly, there is a desire for a technology that may readily retrieve an identifier of a communication object from a hierarchically structured group.

SUMMARY

An aspect of the present invention provides a network controlling method and apparatus that may readily verify a domain including a receiving object by employing, as forwarding information, a routing hint that includes domain identification information of from a top level domain to a domain to which an object is registered, and thereby may overcome an extensibility issue according to an increase in a number of identifiers in a network.

Another aspect of the present invention also provides a network controlling method and apparatus that may readily retrieve a route for a communication between a transmitting object and a receiving object using a routing hint.

According to an aspect of the present invention, there is provided an apparatus for controlling a network using identification information of an object, the apparatus including: an extractor to receive data from a transmitting object, and to extract, from the received data, identification information of a receiving object that is to receive the data, and a controller to verify forwarding information corresponding to identification information of the receiving object by referring to a database and to transfer the data to a gateway associated with a second domain of a subsequent level towards the receiving object based on the forwarding information when the receiving object is not included in the first domain.

According to another aspect of the present invention, there is provided a method of controlling a network using identification information of an object, the method including: receiving data from a transmitting object, to extract, from the received data, identification information of a receiving object that is to receive the data; verifying forwarding information corresponding to identification information of the receiving object by referring to a database when the receiving object is not included in the first domain; and transferring the data to a gateway associated with a second domain of a subsequent level towards the receiving object based on the forwarding information.

According to another aspect of the present invention, the network controlling apparatus can use for information forwarding with the help of object identification information in a hierarchical topology.

According to another aspect of the present invention, the network controlling apparatus can maintain a forwarder information database with the help of object identification information in a hierarchical topology.

According to another aspect of the present invention, the network controlling apparatus can maintain information from another network controlling apparatus, or extract from object identification information.

According to another aspect of the present invention, the network controlling apparatus can transmit lookup information request to a gateway association with the help of route domain request.

According to another aspect of the present invention, the network controlling apparatus further comprising a first network controller can verify that where the receiving object is included in a first root domain.

According to another aspect of the present invention, when the receiving object is not included information in first domain then the network controlling apparatus can verify from the database.

EFFECT

According to embodiments of the present invention, it is possible to readily verify a domain including a receiving object by employing, as forwarding information, a routing hint that includes domain identification information of from a top level domain to a domain to which an object is registered, and thereby overcome an extensibility issue according to an increase in a number of identifiers in a network.

Also, according to embodiments of the present invention, it is possible to readily retrieve a route for a communication between a transmitting object and a receiving object using a routing hint.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a network controlling apparatus and method using identification information of an object according to an embodiment of the present invention will be described with reference to the accompanying drawings.

Figure 1:
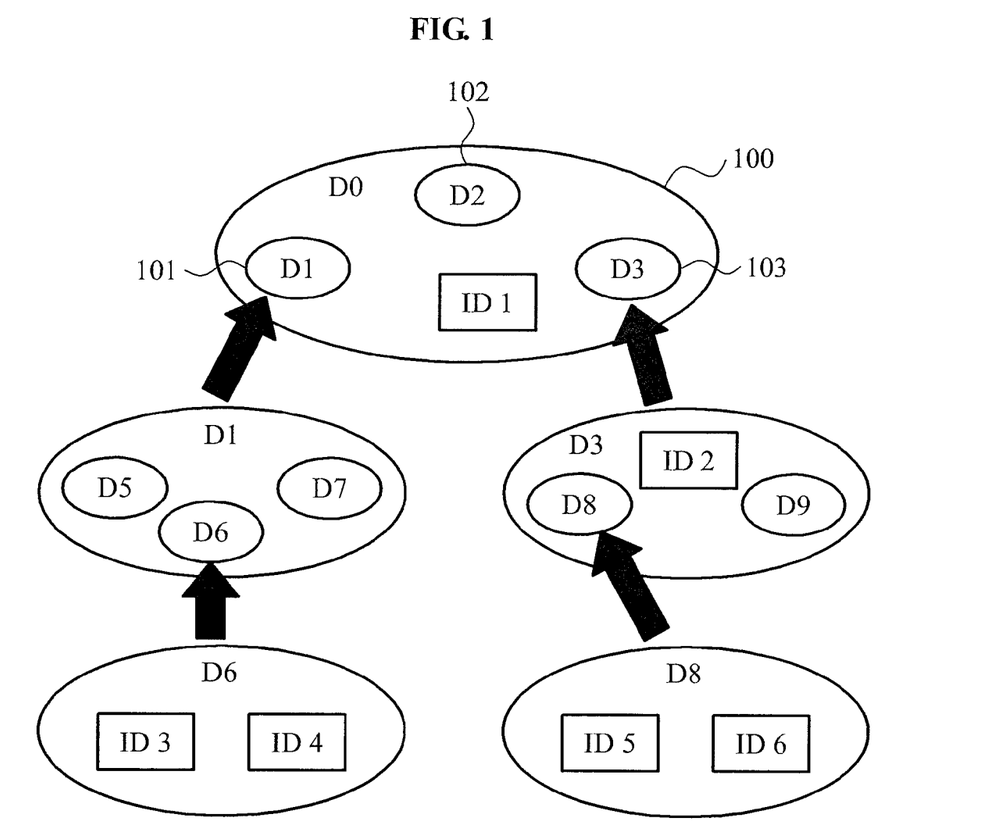
FIG. 1 is a diagram to describe a routing hint used in a network controlling apparatus using identification information of an object according to an embodiment of the present invention.

FIG. 1 is a diagram to describe a routing hint used in a network controlling apparatus using identification information of an object according to an embodiment of the present invention.

Referring to FIG. 1, a domain may be defined as a portion of a network or a portion of a system based on a predetermined criterion. The domain may include other domains and thereby be configured as a hierarchical structure. For example, top level domain_#0 (D0) 101 may include domain_#1 (D1) 101, domain_#2 (D2) 102, and domain_#3 (D3) 103. Domain_#1(D1) 101 may include domain_#5 (D5), domain_#6 (D6), and domain_#7 (D7). Domain_#3 (D3) may include domain_#8 (D8) and domain_#9 (D9).

Also, a domain may include identification information used to identify an object. For example, domain_#1 (D1) 101 may include first identification information (ID1), and domain_#3 (D3) 103 may include second identification information (ID2). Domain_#6 (D6) may include third identification information (ID3) and fourth identification information (ID4), and domain_#8 (D8) may include fifth identification information (ID5) and sixth identification information (ID6).

To retrieve identification information, the network controlling apparatus using identification information of the object may use, as a routing hint, information about a hierarchical structure of a group, for example, a domain including the identification information. For example, the network controlling apparatus may indicate a routing hint about the first identification information (ID1) as 'D0', indicate a routing hint about the second identification information (ID2) as 'D0; D3', indicate the third and fourth identification information (ID3, ID4) as 'D0; D1; D6', and indicate the fifth and sixth identification information (ID5, ID6) as 'D0; D3; D8'.

Figure 2:
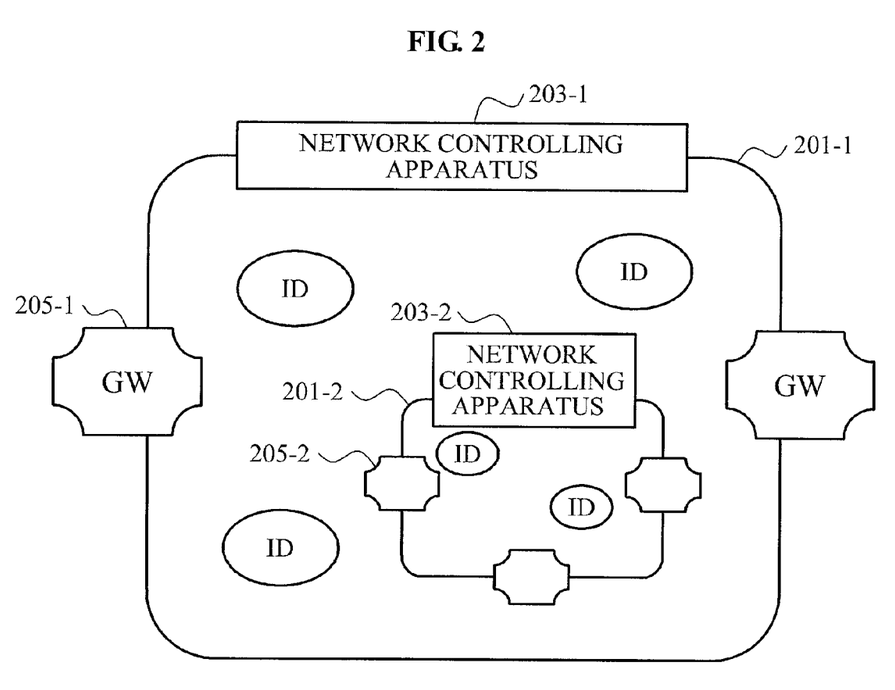
FIG. 2 is a diagram illustrating an example of a domain that is used as a reference for a routing hint according to an embodiment of the present invention.

FIG. 2 is a diagram illustrating an example of a domain that is used as a reference for a routing hint according to an embodiment of the present invention.

Referring to FIG. 2, a domain may be defined as a portion of a network or a portion of a system based on a predetermined criterion. The domain may include, as a constituent element, another domain or a communication object to which globally unique identification information is assigned.

For reference, the communication object assigned with the identification information may need to be registered to at least one domain defined in a network in order to participate in a communication. Also, when the communication object assigned with the identification information is registered to a domain, a routing hint including domain identification information of from a top level domain to a domain registered with an identifier may be included in the identification information.

For example, referring to FIG. 2, domains 201-1 and 201-2 may include network controlling apparatuses 203-1 and 203-2, respectively, to manage a characteristic of a domain or a constituent element of the domain, and may access at least one gateway, for example, gateways (GWs) 205-1 and 205-2 that connect domains to each other.

In this example, each of the gateways (GWs) 205-1 and 205-2 functions to connect at least two domains, and to transfer information between domains, change a protocol data unit, perform an additional function, and the like.

Figure 3:
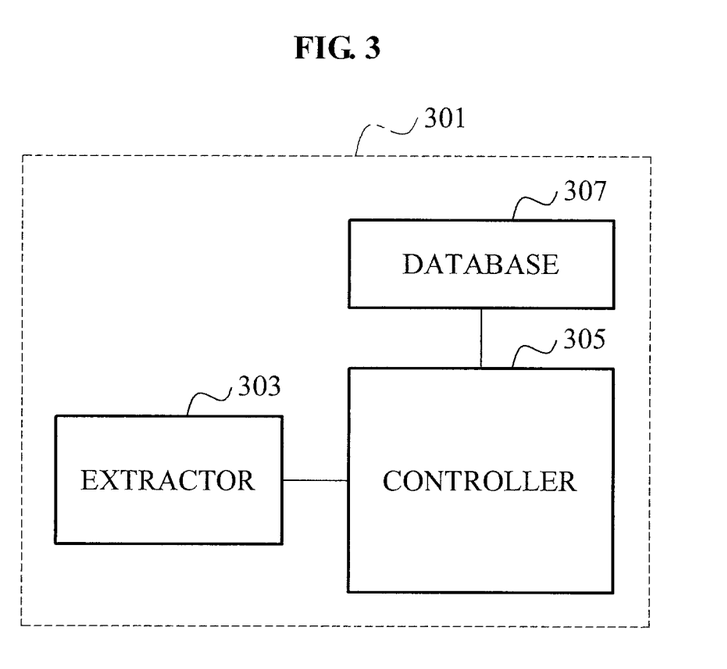
FIG. 3 is a block diagram illustrating a configuration of a network controlling apparatus using identification information of an object according to an embodiment of the present invention.

FIG. 3 is a block diagram illustrating a configuration of a network controlling apparatus 301 using identification information of an object according to an embodiment of the present invention. Here, the network controlling apparatus 301 may be positioned in each domain to manage a characteristic of a corresponding domain or a constituent element thereof.

Referring to FIG. 3, the network controlling apparatus 301 may include an extractor 303, a controller 305, and a database 307.

The extractor 303 may receive data from a transmitting object or another network controlling apparatus and may extract, from the received data, identification information of a receiving object that is to receive the data.

The controller 305 may verify whether the receiving object is included in a first domain and process the data based on the verification result. For example, when the receiving object is included in the first domain, the controller 305 may transmit the data to the receiving object. Conversely, when the receiving object is not included in the first domain that is one of a plurality of domains, the controller 305 may verify, from the database 307, forwarding information that is stored in correspondence to identification information of the receiving object and may transfer the data to a gateway associated with a second domain designated by the forwarding information. Here, the second domain may be distinguished from the first domain and be a domain of a subsequent level towards the receiving object.

When the extracted identification information is not retrieved from the database 307, the controller 305 may verify that the receiving object is not included in the first domain.

The forwarding information may include at least one of a routing hint including domain identification information of from a top level domain to a domain to which an object is registered, domain identification information of the second domain of a subsequent level towards the object registered domain, and an address of the gateway connected to the second domain.

Also, when the forwarding information is not verified from the database 307, the controller 305 may extract a routing hint corresponding to identification of the receiving object from the data, may transmit a route search request to a gateway associated with at least one route domain included in the extracted routing hint, and may determine, as the second domain, a route domain that transmits a response to the route search request and thereby transfer the data to the gateway associated with the second domain.

For example, when the forwarding information about sixth identification information (ID6) is not verified from the database 307, the controller 305 may extract 'D0; D3; D8' from data received from the transmitting object, as a routing hint corresponding to identification information of the receiving object, and may transmit a route search request to a network controlling apparatus associated with at least one route domain included in the extracted routing hint. When a route domain transmitting a response to the route search request is domain_#8 (D8), the controller 305 may determine domain#8 (D8) as the second domain and transfer the data to a gateway associated with domain#8 (D8).

In this example, a domain grade may be assigned to each of the at least one route domain included in the routing hint. The controller 305 may transmit the route search request to a gateway associated with a route domain having a relatively lower domain grade.

For example, when the routing hint includes a first route domain having a relatively upper grade and a second route domain having a relatively lower grade, a first network controlling apparatus associated with the first route domain may receive a route search request from the network controlling apparatus and transfer the route search request to a second network controlling apparatus associated with the second route domain.

In this example, when the route search request is received from the first network controlling apparatus, the second network controlling apparatus may verify whether the receiving object is included in the second route domain. When the receiving object is included in the second route domain as the verification result, the second network controlling apparatus may transmit, to the first network controlling apparatus in response to the route search request, domain identification information about the second route domain and an address of a gateway associated with the second route domain.

Also, when the first network controlling apparatus receives domain identification information about the second route domain and the address of the gateway associated with the second route domain from the second network controlling apparatus as a response to the route search request, the first network controlling apparatus may verify domain identification information about the first route domain and an address of a gateway associated with the first route domain and transmit the verified domain identification information about the first route domain and the address of the gateway associated with the first route domain to the network controlling apparatus 301.

On the contrary, when the first network controlling apparatus does not receive domain identification information about the second route domain and the address of the gateway associated with the second route domain from the second network controlling apparatus as a response to the route search request within a predetermined period of time, or when the first network controlling apparatus receives information regarding that the receiving object is not included in the second route domain, the first network controlling apparatus may verify whether the receiving object is included in the first route domain. When the first network controlling apparatus verifies that the receiving object is included in the first route domain, the first network controlling apparatus may transmit domain identification information about the first route domain and the address of the gateway associated with the first route domain to the network controlling apparatus 301 as a response to the route search request.

For example, when 'D0; D3; D8' is extracted as the routing hint and domain_#0 (D0) corresponds to the first domain, the controller 305 may transmit a route search request to the first network controlling apparatus associated with domain_#3 (D3) and transfer the route search request to the second network controlling apparatus associated with domain_#8 (D8) over the first network controlling apparatus, thereby initially verifying whether the receiving object is included in domain_#8 (D8) corresponding to a relatively lower domain.

When the route search request is received from the first network controlling apparatus, the second network controlling apparatus may verify whether the receiving object is included in domain_#8 (D8). When the receiving object is included in domain_#8 (D8) as the verification result, the second network controlling apparatus may transmit, to the first network controlling apparatus, domain identification information about D8 and an address of a gateway associated with domain_#8 (D8) as a response to the route search request.

Also, when the first network controlling apparatus receives domain identification information about domain_#8 (D8) and the address of the gateway associated with domain_#8 (D8) from the second network controlling apparatus as a response to the route search requests, the first network controlling apparatus may transmit, to the network controlling apparatus 301, domain identification information about domain_#3 (D3) and an address of a gateway associated with domain_#3 (D3) as a response to the route search request.

On the contrary, when the first network controlling apparatus does not receive domain identification information about domain_#8 (D8) and the address of the gateway associated with domain_#8 (D8) from the second network controlling apparatus as a response to the route search request within a predetermined period of time, or when the first network controlling apparatus receives information regarding that the receiving object is not included in domain_#8 (D8), the first network controlling apparatus may verify whether the receiving object is included in domain_#3 (D3). When the first network controlling apparatus verifies that the receiving object is included in domain_#3 (D3), the first network controlling apparatus may transmit domain identification information about domain_#3 (D3) and the address of the gateway associated with domain_#3 (D3) to a top network controlling apparatus as a response to the route search request.

When the forwarding information is not verified from the database 307 and a routing hint corresponding to identification information of the receiving object is not extracted from data that is received from the transmitting object, the controller 305 may transmit a lookup information request to a gateway associated with a route domain having a relatively upper domain grade with respect to the first domain, and may receive forwarding information corresponding to identification information of the receiving object from a gateway associated with the route domain receiving the lookup information request, and may store the forwarding information in the database 307.

When forwarding information corresponding to identification information of the receiving object is stored in an internal database, a network controlling apparatus associated with the route domain having the relatively upper domain grade may transmit the forwarding information corresponding to the identification information of the receiving object to the network controlling apparatus 301. Conversely, when the forwarding information corresponding to the identification information of the receiving object is not stored in the internal database, the network controlling apparatus associated with the route domain having the relatively upper domain grade may transfer a lookup information request to a network controlling apparatus associated with a route domain having a next upper domain grade.

Also, when there is no route domain having a relatively upper domain grade with respect to the first domain, for example, when the first domain has a top level domain grade, the controller 305 may propagate a lookup information request to all of domains within a network by transmitting the lookup information request to gateways associated with route domains having an equivalent or relatively lower domain grade with respect to the first domain.

The database 307 may store identification information of an object included in the first domain and forwarding information corresponding to the identification information. The database 307 may include at least one of a routing hint including domain identification information of from a top level domain to a domain to which the object is registered, domain identification information about a second domain of a subsequent level towards the domain registered with the domain, and an address of a gateway connected to the second domain.

Figure 4:
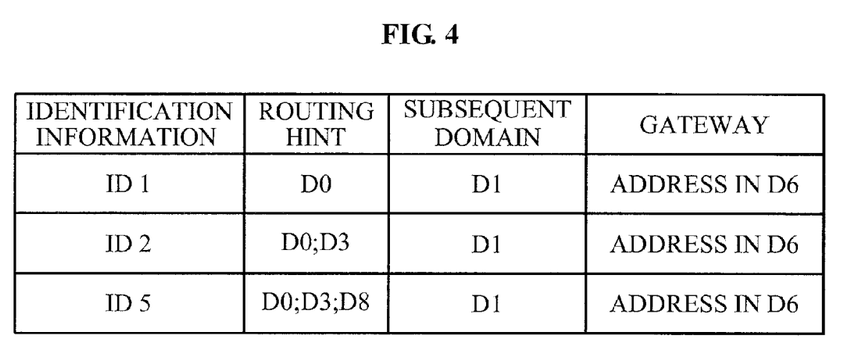
FIG. 4 is a table illustrating an example of forwarding information used in a network controlling apparatus using identification information of an object according to an embodiment of the present invention.

FIG. 4 is a table illustrating an example of forwarding information used in a network controlling apparatus using identification information of an object according to an embodiment of the present invention.

Referring to FIG. 4, in correspondence to identification information of the object, the network controlling apparatus may maintain, in a database as forwarding information, a routing hint, domain identification information about a subsequent level of a second domain towards a domain registered with the object, and an address of a gateway connected to the second domain.

For example, in correspondence to first identification information (ID1), the network controlling apparatus may maintain, in the database, top level domain_#0 (D0) as a routing hint, domain_#1 (D1) as a subsequent level of a second domain, and a gateway address of a sixth domain as an address of a gateway connected to the second domain.

Figure 5:
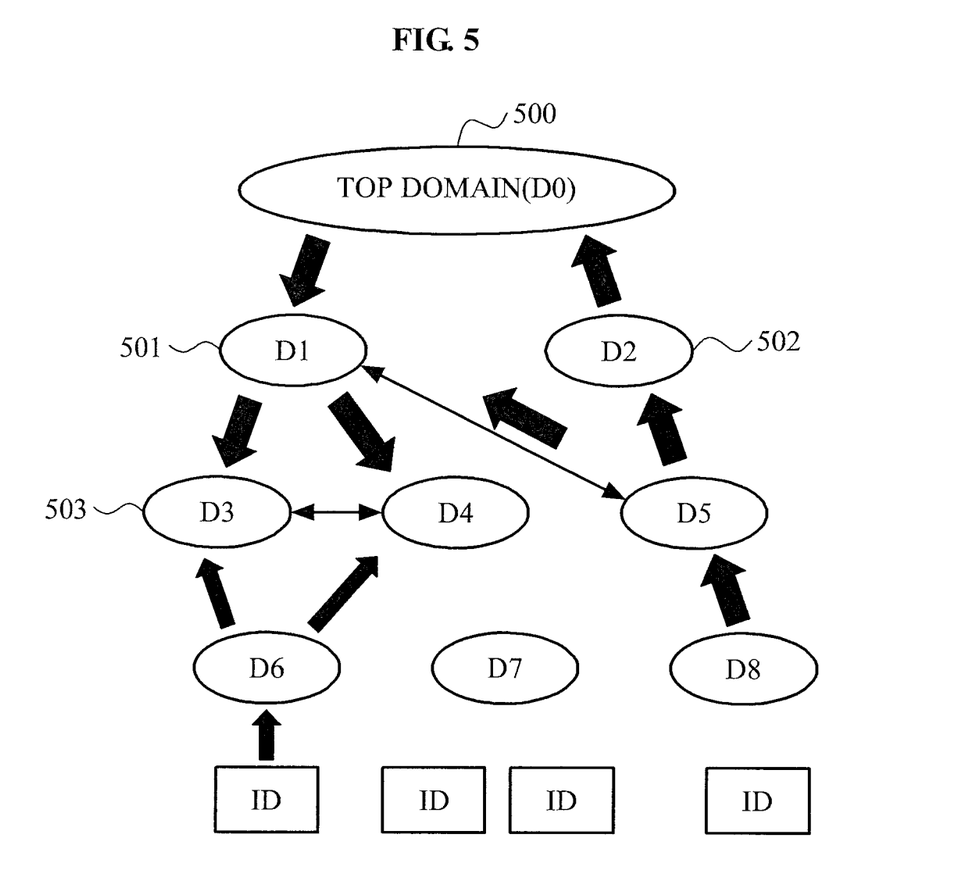
FIG. 5 is a diagram to describe a lookup propagation method in a network controlling apparatus using identification information of an object according to an embodiment of the present invention.

FIG. 5 is a diagram to describe a lookup propagation method in a network controlling apparatus using identification information of an object according to an embodiment of the present invention.

Referring to FIG. 5, when forwarding information about a receiving object is not retrieved from an internal database and a routing hint corresponding to identification information of the receiving object cannot be extracted from data that is received from a transmitting object, the network controlling apparatus may perform look propagation.

For example, network controlling apparatus_#3 associated with domain_#3 (D3) 503 may transmit a lookup information request to network controlling apparatus_#1 associated with domain_#1 (D1) 501 corresponding to an upper domain of domain_#3 (D3) 503, and may receive forwarding information corresponding to identification information of the receiving object from network controlling apparatus_#1 as a response to the lookup information request.

In this example, when forwarding information corresponding to identification to information of the receiving object is stored in the internal database, network controlling apparatus_#1 may transmit the forwarding information to network controlling apparatus_#3. On the contrary, when forwarding information corresponding to identification information of the receiving object is not stored in the internal database, network controlling apparatus_#1 may transfer a lookup information request to network controlling apparatus_#0 associated with a next upper domain, for example, top domain (D0) 500.

When forwarding information corresponding to identification information of the receiving object is stored in the internal database, network controlling apparatus_#0 may transmit the forwarding information to network controlling apparatus_#1. Conversely, when forwarding information corresponding to identification information of the receiving object is not stored in the internal database, network controlling apparatus_#0 may transfer a lookup information request to network controlling apparatus_#2 associated with domain_#2 (D2) 502 excluding domain_#1 (D1) 501 in which network controlling apparatus_#1 having transmitted the lookup information request is included.

Figure 6:
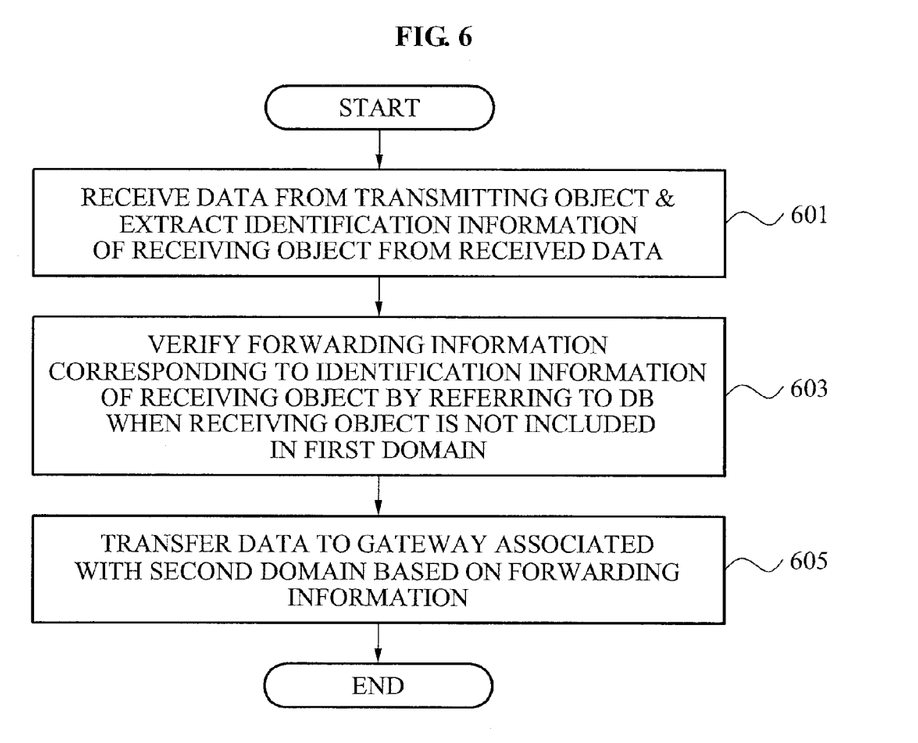
FIG. 6 is a flowchart illustrating a network controlling method using identification information of an object according to an embodiment of the present invention.

FIG. 6 is a flowchart illustrating a network controlling method using identification information of an object according to an embodiment of the present invention.

Referring to FIG. 6, in operation 601, a network controlling apparatus may receive data from a transmitting object or another network controlling apparatus, and may extract, from the received data, identification information of a receiving object that is to receive the data.

In operation 603, when the receiving object is not included in a first domain, the network controlling apparatus may verify forwarding information corresponding to identification information of the receiving object by referring to a database.

In this example, when the identification information of the receiving object is not retrieved from the database as a search result, the network controlling apparatus may verify that the receiving object is not included in the first domain. Here, the database may store identification information of an object included in the first domain and forwarding information corresponding to the identification information.

Also, when the receiving object is not included in the first domain, the network controlling apparatus may verify, from the database, forwarding information that is stored in correspondence to identification information of the receiving object.

The forwarding information may include at least one of a routing hint including domain identification information of from a top level domain to a domain to which an object is registered, domain identification information about a second domain of a subsequent level towards the object registered domain, and an address of a gateway connected to the second domain.

In operation 605, the network controlling apparatus may transfer the data to the gateway associated with the subsequent level of the second domain towards the receiving object based on the forwarding information.

Conversely, when the receiving object is verified to be included in the first domain in operation 603, the network controlling apparatus may transmit the data to the receiving object.

When the forwarding information is not verified from the database in operation 603, the network controlling apparatus may extract a routing hint corresponding to identification information of the receiving object from the data, may transmit a route search request to a gateway associated with at least one route domain included in the extracted routing hint, and may determine, as the second domain, a route domain transmitting a response to the search route request.

When the forwarding information is not verified from the database, and a routing hint corresponding to identification information of the receiving object is not extracted from data that is received from the transmitting object, the network controlling apparatus may transmit a lookup information request to a gateway associated with a route domain having a relatively upper domain grade with respect to the first domain and may receive forwarding information corresponding to identification information of the receiving object from a gateway associated with the route domain receiving the lookup information request.

In this example, when there is not route domain having the relatively upper domain grade with respect to the first domain, for example, when the first domain has a top level domain grade, the network controlling apparatus may transmit a lookup information request to a gateway associated with a route domain having an equivalent or relatively lower domain grade with respect to the first domain.

According to embodiments of the present invention, it is possible to readily verify a domain including a receiving object by employing, as forwarding information, a routing hint that includes domain identification information of from a top level domain to a domain to which an object is registered, and thereby overcome an extensibility issue according to an increase in a number of identifiers in a network.

Also, according to embodiments of the present invention, it is possible to readily retrieve a route for a communication between a transmitting object and a receiving object using a routing hint.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for controlling a network using identification information of an object, the apparatus comprising:
   an extractor configured to receive data and extract identification information from the received data, wherein the identification information directly determines a receiving object that is to receive the data; and
   a controller to verify, from a database, forwarding information that is stored in correspondence to the identification information, and to transfer the data to a gateway associated with a second domain designated by the forwarding information, when the receiving object is not included in a first domain,
   wherein when the forwarding information is not verified from the database and a routing hint corresponding to identification information of the receiving object is not extracted from the data, the controller transmits a lookup information request to a route domain having a relatively upper domain grade with respect to the first domain, and receives forwarding information corresponding to identification information of the receiving object from a gateway associated with the route domain that receives the lookup information request.

2. The apparatus of claim 1, wherein when the extracted identification information is not retrieved from the database, the controller verifies that the receiving object is not included in the first domain.

3. The apparatus of claim 1, wherein the database comprises, as the forwarding information, at least one of a routing hint including domain identification information of from a top level domain to a domain to which the receiving object is registered, domain identification information associated with the second domain, and an address of the gateway connected to the second domain.

4. The apparatus of claim 1, wherein when the forwarding information is not verified from the database, the controller extracts a routing hint corresponding to identification information of the receiving object from the data, transmits a route search request to a gateway associated with at least one route domain included in the extracted routing hint, and determines, as the second domain, a route domain that transmits a response to the route search request and thereby transfers the data to the gateway associated with the second domain.

5. The apparatus of claim 4, wherein:
   a domain grade is assigned to each of the at least one route domain included in the routing hint, and
   the controller transmits the route search request to a gateway associated with a route domain having a relatively lower domain grade.

6. The apparatus of claim 1, wherein there is no route domain having the relatively upper domain grade with respect to the first domain, the controller transmit the lookup information request to a gateway associated with a route domain having an equivalent or relatively lower domain grade with respect to the first domain.

7. The apparatus of claim 1, wherein when the receiving object is included in the first domain, the controller transmits the data to the receiving object.

8. The apparatus of claim 1, wherein network controlling apparatus can use for information forwarding with the help of object identification information in a hierarchical topology.

9. The apparatus of claim 1, wherein network controlling apparatus can maintain a forwarder information database with the help of object identification information in a hierarchical topology.

10. The apparatus of claim 1, wherein network controlling apparatus can maintain information from another network controlling apparatus, or extract from object identification information.

11. The apparatus of claim 1, wherein network controlling apparatus can transmit lookup information request to a gateway association with the help of route domain request.

12. The apparatus of claim 1, further comprising:
a first network controller can verify that where the receiving object is included in a first root domain.

13. The apparatus of claim 1, wherein when the receiving object is not included information in first domain then the network controlling apparatus can verify from the database.

14. The present invention can be recorded in computer readable media including program instructions to implement various operations embodied by a computer.

15. A method of controlling a network using identification information of an object, the method comprising:
receiving data;
extracting identification information from the data, wherein the identification information directly determines a receiving object that is to receive the data;
verifying, from a database, forwarding information that is stored in correspondence to the identification information when the receiving object is not included in a first domain;
transferring the data to a gateway associated with a second domain designated by the forwarding information; and
transmitting a lookup information request to a route domain having a relatively upper domain grade with respect to the first domain, and receiving forwarding information corresponding to identification information of the receiving object from a gateway associated with the route domain that receives the lookup information request, when the forwarding information is not verified from the database and a routing hint corresponding to identification information of the receiving object is not extracted from the data.

16. The method of claim 15, further comprising:
verifying that the receiving object is not included in the first domain when the extracted identification information is not retrieved from the database.

17. The method of claim 15, wherein the verifying comprises verifying, as the forwarding information, at least one of a routing hint including domain identification information of from a top level domain to a domain to which the receiving object is registered, domain identification information associated with the second domain, and an address of the gateway connected to the second domain.

18. The method of claim 15, further comprising:
extracting a routing hint corresponding to identification information of the receiving object from the data when the forwarding information is not verified from the data base; and
transmitting a route search request to a gateway associated with at least one route domain included in the extracted routing hint, and determining, as the second domain, a route domain that transmits a response to the route search request to thereby transfer the data to the gateway associated with the second domain.

19. The method of claim 15, further comprising:
transmitting the data to the receiving object when the receiving object is included in the first domain.

\* \* \* \* \*